United States Patent
Bouygues et al.

(10) Patent No.: US 11,618,097 B2
(45) Date of Patent: Apr. 4, 2023

(54) WELDER COMPRISING A DETACHABLE ARM PROVIDED WITH A ROTATIONALLY MOBILE PART SUPPORTING AN ELECTRODE

(71) Applicant: GYS, Saint-Berthevin (FR)

(72) Inventors: Bruno Bouygues, Paris (FR); Mickaël Gabillard, Montigne-le-Brillant (FR)

(73) Assignee: GYS, Saint-Berthevin (FR)

( * ) Notice: Subject to any disclaimer, the term of this patent is extended or adjusted under 35 U.S.C. 154(b) by 175 days.

(21) Appl. No.: 16/934,510

(22) Filed: Jul. 21, 2020

(65) Prior Publication Data
US 2021/0023647 A1    Jan. 28, 2021

(30) Foreign Application Priority Data
Jul. 24, 2019 (FR) ...................... 1908407

(51) Int. Cl.
*B23K 11/11*    (2006.01)
(52) U.S. Cl.
CPC .................. *B23K 11/115* (2013.01)
(58) Field of Classification Search
CPC ..... B23K 11/115; B23K 11/253; B23K 11/28; B23K 11/314; B23K 11/25; B23K 11/251; B23K 11/252
USPC ..................................................... 219/86.21
See application file for complete search history.

(56) References Cited

U.S. PATENT DOCUMENTS 5,254,828 A    10/1993 Stiebel
5,981,898 A * 11/1999 Yamaguchi .......... B23K 11/317
                                                          219/91.1
6,706,990 B1    3/2004 Olsson
9,266,187 B2 *  2/2016 Cohen .................. B23K 11/257
2008/0272093 A1* 11/2008 Sato ..................... B23K 11/314
                                                          219/119

FOREIGN PATENT DOCUMENTS

EP    1614496 A2    1/2006
EP    3231546 A1   10/2017

OTHER PUBLICATIONS

English translation of Written Opinion dated Mar. 11, 2020 for corresponding French Application No. 1908407, filed Jul. 24, 2019.
French Search Report and Written Opinion dated Mar. 11, 2020 for corresponding French Application No. 1908407, filed Jul. 24, 2019.

* cited by examiner

*Primary Examiner* — Dana Ross
*Assistant Examiner* — James F Sims, III
(74) *Attorney, Agent, or Firm* — David D. Brush; Westman, Champlin & Koehler, P.A.

(57) ABSTRACT

A resistance welder, which includes a clamp for supporting a detachable arm, the arm being constituted by a fixed part supporting a fixed electrode and a rotationally mobile part supporting a mobile electrode. The electrodes are intended to be crossed by an electrical current. The mobile arm of the clamp is pushed in its rotational motion by a thruster so that the extremities of the electrodes approach each other and grip the elements to be welded. The clamp further includes a shift measurement sensor, the value measured by this sensor being proportional to the distance between the extremities of the electrodes. It is thus easy to measure the distance between the electrodes and the measurement made on the piston can be used for other types of arms.

7 Claims, 6 Drawing Sheets

Figure 1:
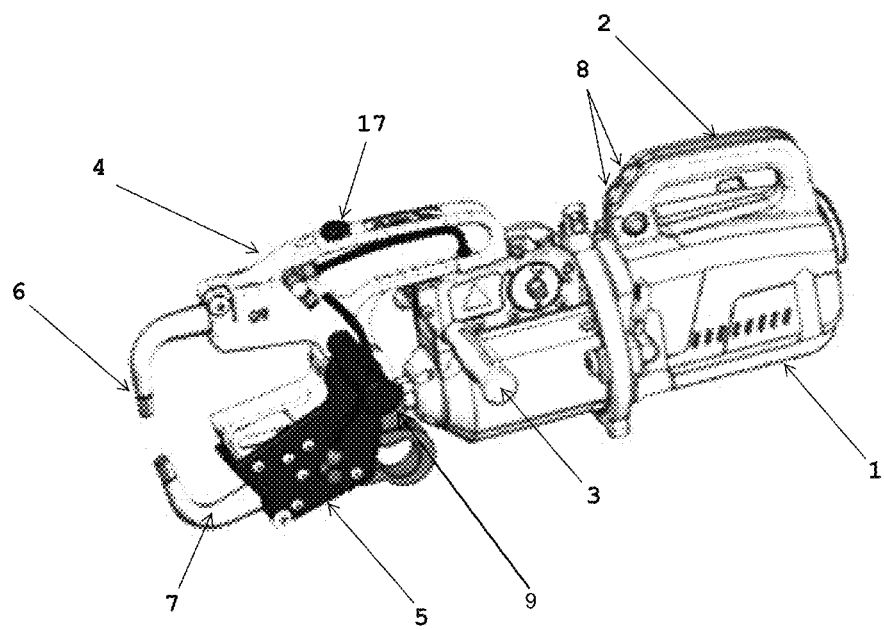

Fig. 9
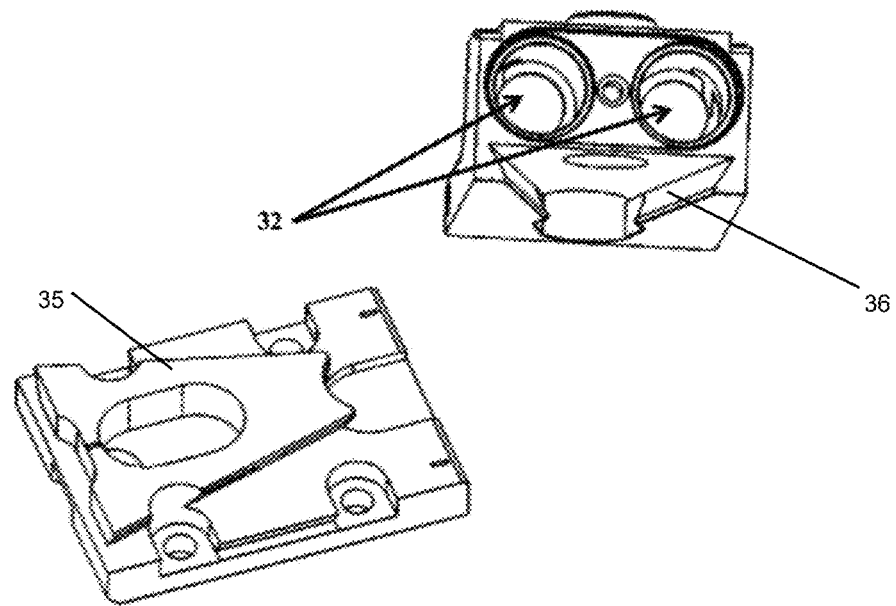
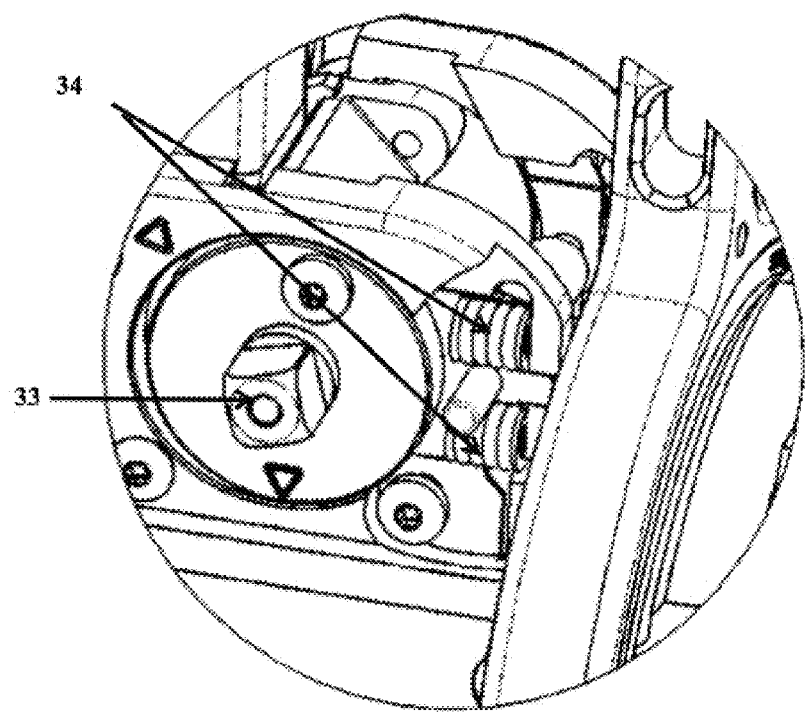
Fig. 10

WELDER COMPRISING A DETACHABLE ARM PROVIDED WITH A ROTATIONALLY MOBILE PART SUPPORTING AN ELECTRODE

FIELD OF THE INVENTION

The invention relates to a resistance welding device or welder comprising a clamp designed to support a detachable arm. The invention relates more particularly to the fact that said arm is constituted by a fixed part supporting a fixed electrode and a rotationally mobile part supporting a mobile electrode.

PRIOR ART AND ITS DRAWBACKS

The field of the invention is that of resistance welders. These devices have means for generating very high electrical currents that are transmitted through two electrodes mutually gripping the materials to be welded. Since the electrical resistance of the materials is greater than that of the electrodes, the passage of the current heats the materials and the welding is done. The unit supporting the electrodes is called a clamp. These devices advantageously have several sets of clamps to match the thickness of the materials as well as the space available to house the electrodes during the welding operation.

There are known spot welders provided with a unit comprising a clamp with an inverted-C-shaped arm terminating in a first electrode and another electrode that is mobile in translation within the unit. Present-day devices have two thrusters to control the forward and rearward movements of the electrode of the unit in order to close and open the clamp. There are also known ways of using a rotational movement of the electrodes as in a pair of scissors. The invention more specifically relates to a set of two arms and a clamp enabling the use equally well of C-shaped arms and of arms having a scissor-like motion.

The mechanical system comprises a pneumatic actuator that imparts a linear motion to a clamp electrode, electrical contacts designed to let through very high currents (1,000 A to 15,000 amperes for example), an automatic hydraulic connector for the water-based cooler system and a mechanical assembly used to convert the linear motion into a rotational motion, a mechanical assembly enabling the blocking and then the releasing of the mobile electrode of the thruster by simple pressure on a button.

Present-day devices have locking means that are complicated and lengthy to implement. They require the use of specific tools for assembly and disassembly and even require the mobilizing of two persons.

Present-day devices are generally equipped with two thrusters to open and close the electrodes, thus increasing the number of devices and increasing the risks of malfunction and the costs of manufacturing the device.

GOALS OF THE INVENTION

The present invention proposes a welder provided with an arm with scissor movement for a spot-welding clamp with C-like motion. This device has a mechanism enabling the conversion of a linear motion of a clamp electrode into a rotational motion of the mobile arm. In addition, the proposed device benefits from another mechanism serving to automatically lock the mobile electrode to the clamp electrode and thus fixedly attach the two elements such that a determined movement of the clamp electrode prompts a rotation of the mobile electrode by a determined angle.

SUMMARY OF THE INVENTION

To this end, the invention relates to a resistance welder comprising a clamp for supporting a detachable arm, said arm being constituted by a fixed part supporting a fixed electrode and a rotationally mobile part supporting a mobile electrode, the electrodes being intended to be crossed by an electrical current. The mobile arm of the clamp is pushed in its rotational motion by a thruster so that the extremities of the electrodes approach each other and grip the elements to be welded, the clamp further comprising a shift measurement sensor, the value measured by this sensor being proportional to the distance between the extremities of the electrodes.

In this way, it is easy to measure the distance between the electrodes, and the measurement made on the piston can be used for other types of arms.

The measurement of the distance between the two electrodes makes it possible to deduce the thickness of the elements to be welded, such as metal sheets, thus making it possible to determine the welding parameters to be applied automatically.

According to a first embodiment, the resistance welder comprises a slider provided with a cylinder pushed in translation by the head of the thruster, said cylinder comprising two diametrically opposite rings that get housed in oblong holes situated on each side of the flanks of the mobile arm to provide for the angular alignment of the slider during the shifting of the head of the piston.

According to another embodiment, the resistance welder comprises a mechanism for locking the arm to affix it to the clamp, this mechanism comprising a lock comprising a latch that gets clipped into a groove.

According to another embodiment, the locking of the arm consists in moving it downwards to engage a blocking element into a groove and then turning a handle to lock the arm.

According to another embodiment, the clamp is designed to also support a C-shaped arm constituted by a fixed part supporting a fixed electrode and a part that is mobile in translation supporting a mobile electrode, the thruster directly driving the motion of the mobile electrode.

According to another embodiment, the chamber of the thruster is over-pressurized to bring the electrodes closer together and depressurized to move them further apart, the pressure of the pneumatic fluid that actuates the thruster of the clamp being controlled by two solenoid valves which, when open, generate a Venturi effect on the pipings and a pressure lower than atmospheric pressure, this pressure being transmitted to the clamp unit by a flexible tube or hose.

According to another embodiment, the mechanism for blocking the arm comprises two brass parts providing for mechanical blocking, electrical continuity and the passage of cooling water, the two parts being fixedly attached by two dovetails forming a V.

According to another embodiment, the arm gets affixed by a pivoting motion about an axis passing through two spikes, and then by a translation motion enabling the V-shaped male structure of the dovetail that is affixed to the arm to slide into a V-shaped female structure of the dovetail that is affixed to the clamp unit.

LIST OF FIGURES

Figure 2:
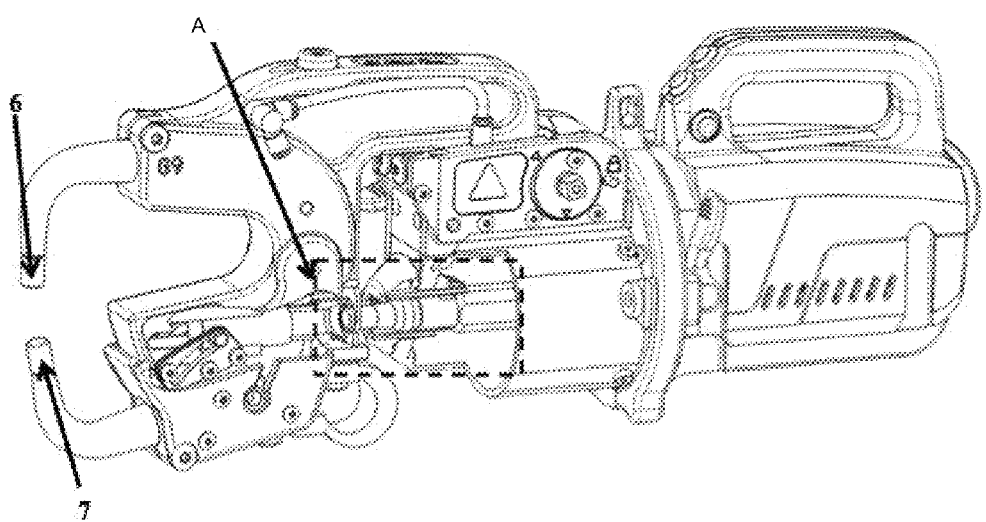
Figure 3:
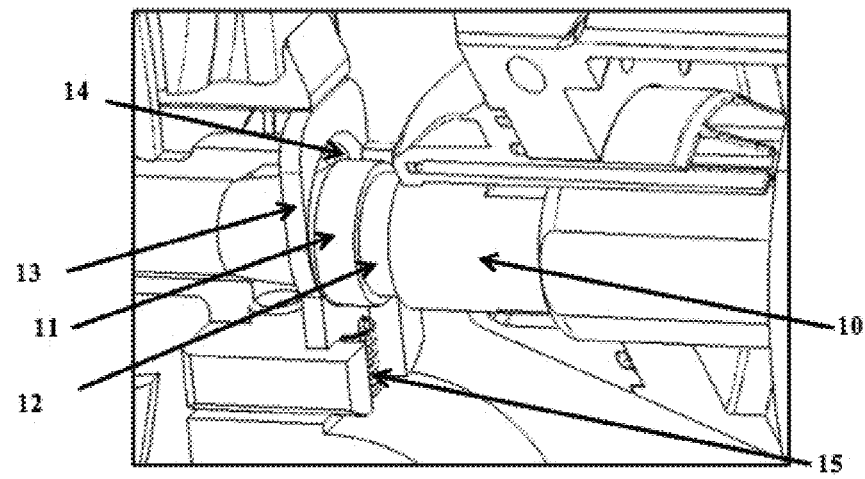
Figure 4:
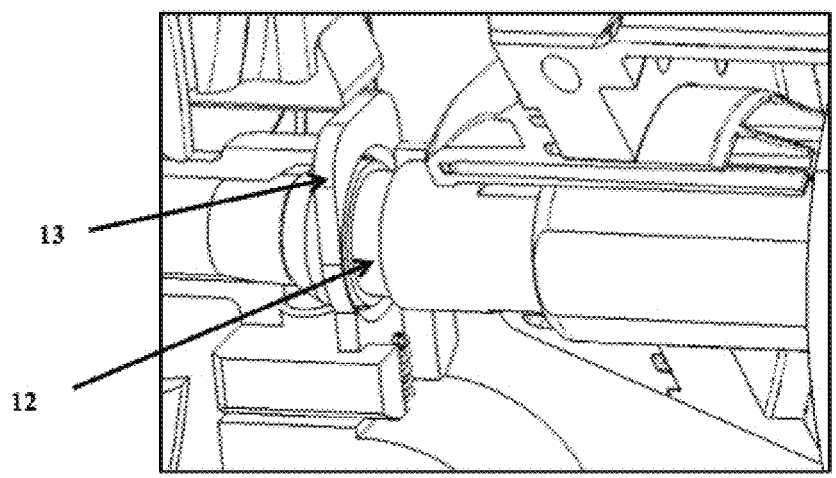
Figure 5:
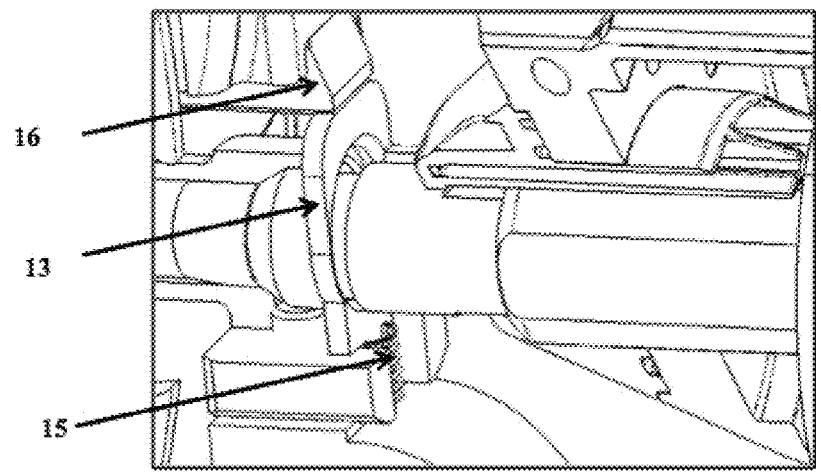
Figure 6:
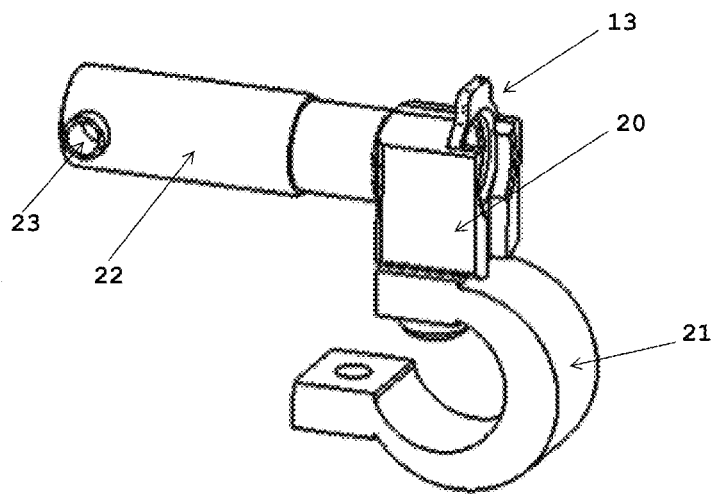
Figure 7:
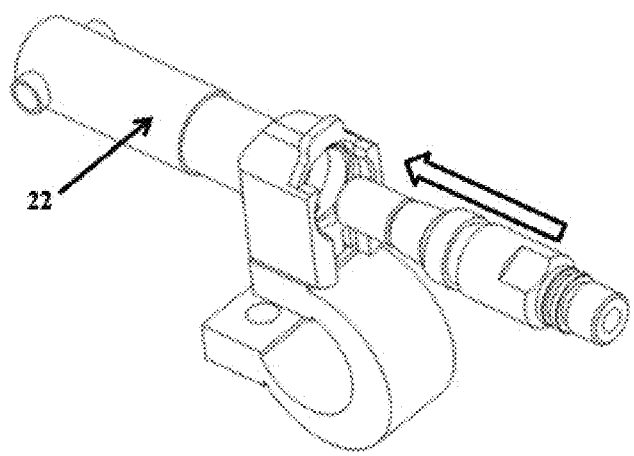
Figure 8:
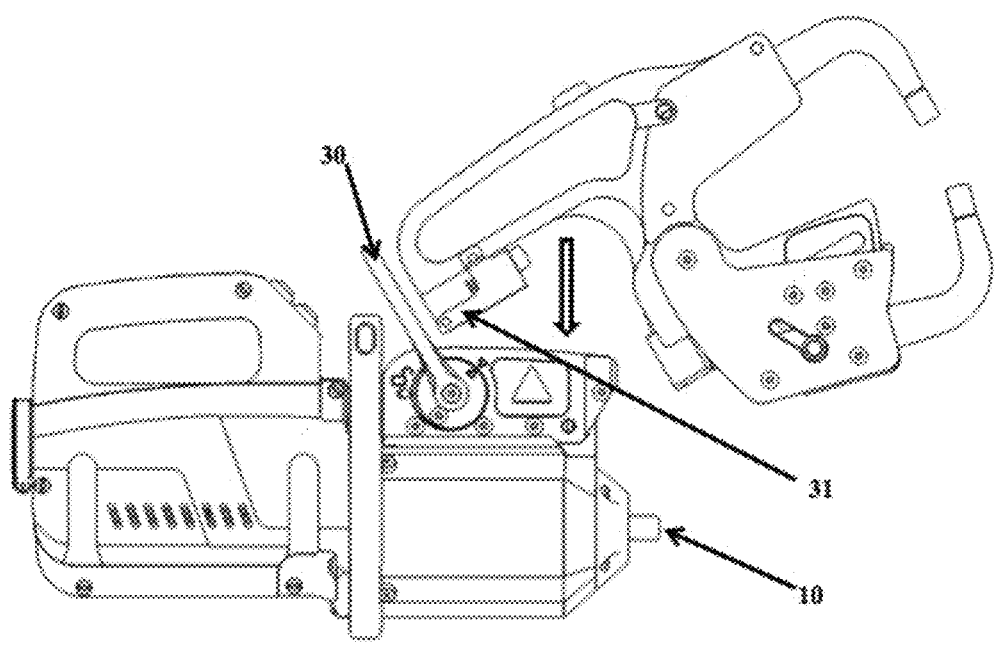
Figure 11:
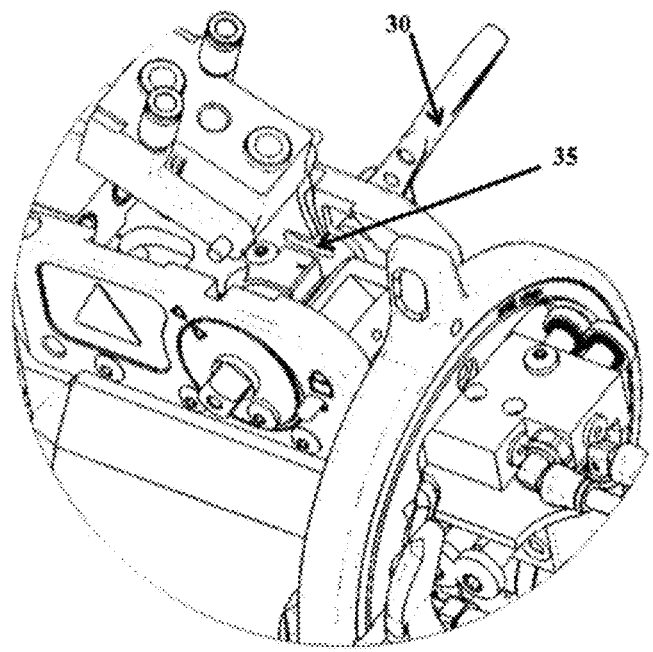
Figure 12:
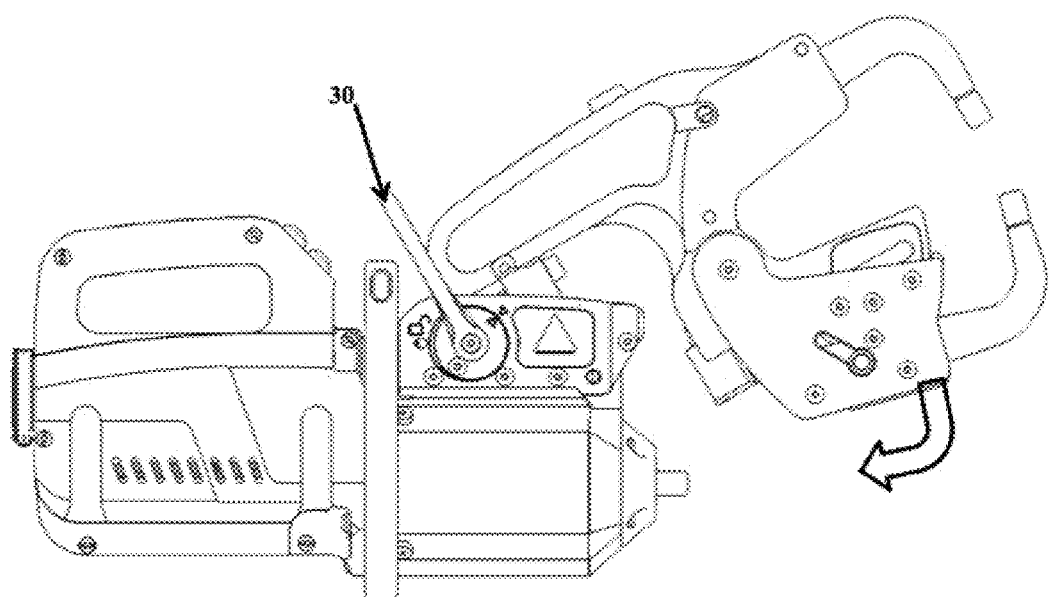
Figure 13:
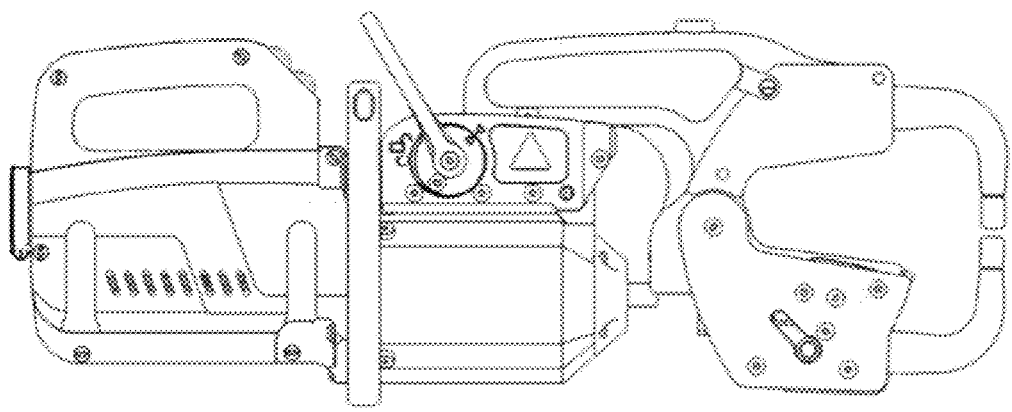
Figure 14:
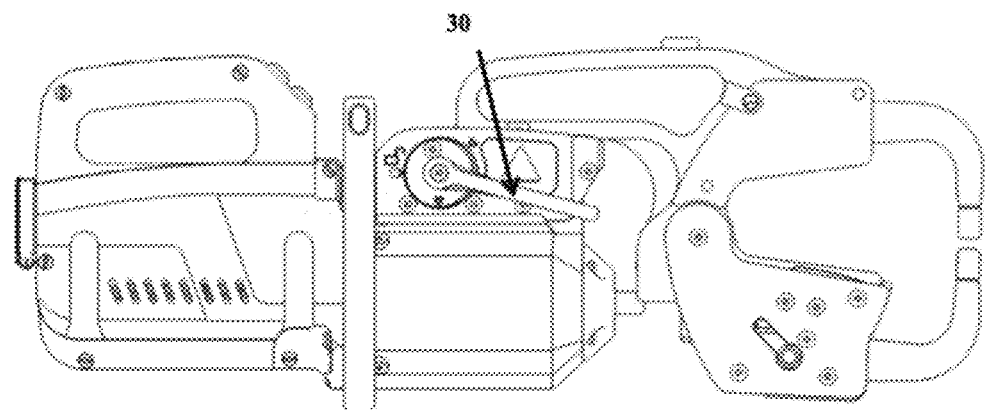
Figure 15:
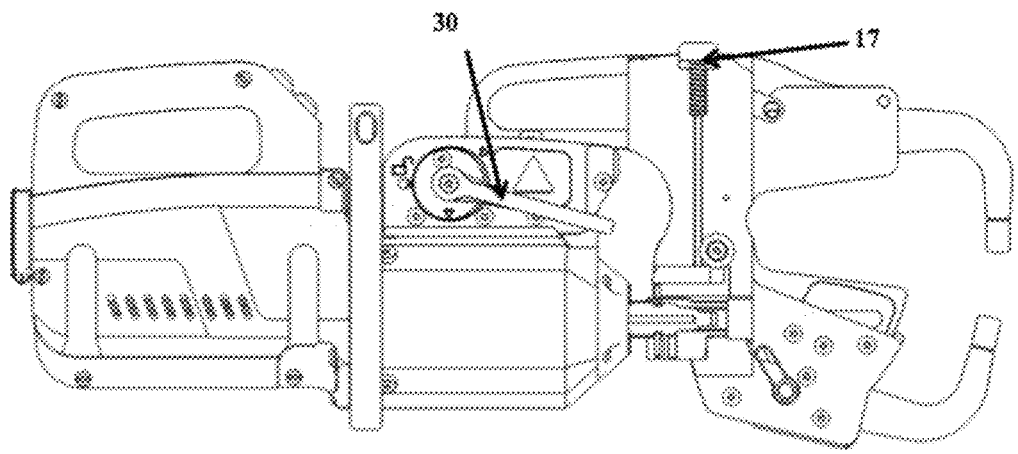

Other features and advantages of the invention shall now appear more clearly within the context of the following description of embodiments given by way of a non-exhaustive illustration with reference to the appended figures, of which:

FIG. 1 presents an arm-and-clamp assembly provided with two welding electrodes according to one embodiment;

FIG. 2 is a diagram of the same arm-and-clamp assembly as the previous figure with the open clamp;

FIG. 3 presents an enlarged view of a detail within box A of FIG. 2 showing the rod of the thruster at the beginning of its affixation to the mobile arm;

FIG. 4 presents an enlarged view of a detail from the previous figures showing the rod of the thruster sliding in the circular window shortly after the motion described in the previous figure;

FIG. 5 presents an enlarged view of a detail from the previous figures showing the latch in its position for locking the mobile arm with the rod of the thruster;

FIG. 6 presents a slider sub-assembly of the arm used to grip the lengthening piece of the clamp;

FIG. 7 presents the position of the arm before it is inserted into the clamp according to a preferred embodiment;

FIG. 8 presents the way in which the electrode of the clamp and the arm get coupled, in obtaining an efficient electrical contact;

FIG. 9 shows the male part and female part forming the dovetail affixation of the two-arm unit to the clamp;

FIG. 10 presents an enlarged view of a detail from the preceding figures showing the elements used to lock the arm;

FIG. 11 presents an enlarged view of another view of the mechanism in an unlocking position;

FIG. 12 presents the position of the two-arm unit when it is put into contact with the clamp;

FIG. 13 represents the position of the two-arm unit after rotation;

FIG. 14 presents the position of the two-arm unit with the blocking handle in lowered position;

FIG. 15 presents the arm-and-clamp assembly with the rod of the thruster fixedly attached with the mobile arm.

DETAILED DESCRIPTION OF EMBODIMENTS OF THE INVENTION

General Principle

The invention relates to a resistance welder comprising a clamp intended to support a detachable arm, said arm being constituted by a fixed part supporting a fixed electrode and a rotationally mobile part supporting a mobile electrode. The electrodes are to be crossed by an electrical current. The mobile arm of the clamp is pushed in its rotational motion by a thruster so that the extremities of the electrodes approach each other and grip the electrodes to be welded, the clamp furthermore comprising a shift-measuring sensor, the measurement taken by this sensor being proportional to the distance between the extremities of the electrodes.

The measurement of the distance between the two electrodes makes it possible to deduce the thickness of the elements to be welded, such as metal sheets, thus making it possible to determine the welding parameters to be applied automatically.

Description of One Embodiment

FIG. 1 presents an arm-and-clamp assembly provided with two welding electrodes according to a preferred embodiment. The clamp 1 has grasping and handling means such as an upper grip 2 and a side grip 3, detachable if necessary. The clamp 1 is extended frontwards by a fixed arm 4, preferably situated above a mobile arm 5. The fixed arm 4 is terminated by a fixed electrode 6 and the mobile arm is terminated by a mobile electrode 7. The arm-and-clamp assembly can be held by an operator or fixed to the extremity of a robotic arm. Two control buttons 8 are placed in proximity to the grip 2 to enable the operator to open and close the clamp.

FIG. 2 is a diagram of the same arm-and-clamp assembly as that of the previous figure with the clamp open, and showing the internal elements. The electrodes 6 and 7 are opened out, enabling the insertion between them of the metal elements to be welded. The rotation of the mobile arm 7 about an axis 9 opens out the electrodes along a distance that depends on the angle of rotation. The assembly comprising the two arms is fixedly attached to the clamp by a blocking mechanism which shall be described here below.

Once the two arms are fixedly attached with the clamp, the operator presses a button 8 to make the rod of the thruster move forward and enable it to be fixedly attached with the mobile arm according to a mechanism that shall now be explained. The enlarged details in the following figures present a focus on the boxed zone in FIG. 2, when the rod of the thruster moves forward.

FIG. 3 presents an enlarged view of the rod of the thruster at the beginning of its affixation with the mobile arm. The head of the rod 10 has a chamfered portion and then a circular section 11 that continues in the direction opposite to the electrodes by an annular groove 12 with a flank perpendicular to the axis of the thruster. The head of the rod 10 gets inserted into a circular window 13 made in a vertical latch 14 and gets introduced into the extremity of the mobile electrode which takes the form of a conical surface. The angles of the cone and of the chamfer complement each other so as to obtain an efficient electrical contact. The vertical dimension of the window is greater than its horizontal dimension, and its flank is also chamfered. The latch 14 gets shifted vertically into recesses fixedly attached to the mobile arm. A spring 15 at the lower part exerts pressure on the latch to make it rise.

At the beginning of the introduction of the head of the rod into the window, the chamfers of the circular window 13 and the head of the rod are in contact and exert downward pressure on the latch which gets lowered in being flush with the lower surface of the rod of the thruster. The spring 15 then gets compressed.

According to the invention, the shifting of the mobile electrode is obtained by the forward and rearward motions of a single thruster, that is alternately pressurized and depressurized and controlled by the buttons 8. The chamber of the thruster is designed to be subjected to over-pressure to bring the electrodes together and to be depressurized to move them apart, the pressure of the pneumatic fluid that actuates the thruster of the clamp being controlled by two solenoid valves which, in an open position, generate a Venturi effect on the pipes and a pressure lower than atmospheric pressure, this pressure being transmitted to the clamp unit by a hose or flexible tube. The electrodes are in contact when the chamber of the thruster is subjected to over-pressure. In this way, a single thruster is needed to move the rod forward or rearwards and therefore to open and close the electrodes.

FIG. 4 presents the rod of the thruster sliding in the circular window shortly after the moment described by the previous figure. The rod of the thruster continues to move forward and the latch is now situated at the height of the circular section 11. The spring 15 is then in its maximum position of compression.

FIG. 5 presents the latch in its position when the mobile arm is locked with the rod of the thruster. In its forward progress, the rod of the thruster makes the latch 14 pass above the circular section 11 and the ridge of the window is then at the level of the annular groove 12. The pressure of the spring pushes the latch back upwards, its surface being therefore in contact with the perpendicular flank of the annular groove 12. Since the thickness of the latch is advantageously almost identical to the width of the annular groove, the former is then fixedly locked with the latter. Any movement of the rod of the thruster leads to a shift in the same direction of the latch and therefore of the mobile arm 5. Hence, a forward movement of the rod of the thruster activates a rotation of the mobile arm about the axis 9 and makes the electrodes come together. The distance between the electrodes increases proportionally to the rearward shift of the rod of the thruster.

A sensor is mounted on the rod of the thruster in order to measure its shift, this sensor produces therefore a representative value proportional to the distance between the two electrodes. The value measured by the sensor is if necessary viewable on a screen and can also be recorded as a timeline parameter of the welding performed. The value given by the sensor can also be used to set up an automatic link between the respective positions of the electrodes before starting a welding cycle. The measurement sensor is for example a linear potentiometer that follows the motions of the rod of the thruster.

The spring compressed in this position holds the locked position between the head of the rod and the mobile arm. To unlock the system, it is then enough to lower the latch again and push the rod of the thruster back rearwards. This motion is done by means of a vertical rod that terminates in a right-angled element part 16 that exerts pressure on the latch to thus release the locking mechanism. The vertical rod passes through the entire height of the two-arm assembly and emerges on the upper surface by a pad 17 that can be seen in FIG. 1. During the dismantling, the operator presses on this pad and the button to control the rod of the thruster in its reverse operation.

The arm-and-clamp assembly described here above has the advantage of using units formed by both arms on many types of machine. The unit formed by the two arms is fixedly attached with the clamp by a single blocking mechanism situated above the grip 3. In this way, it is possible to use the same clamp with a unit formed by the C-shaped electrodes, the two terminal arms of which possess extremities, one of which turns back towards the other extremity, these two extremities facing each other. The length of the intermediate arm defining the distance between the electrodes corresponds to the length of the rod of the thruster. In such a machine, there are no parts in rotation, and the distance between the two extremities of the electrodes depends directly on the distance travelled by the rod of the thruster. The present invention enables the use equally well of the C-shaped arms or of pivoting arms on one and the same clamp.

FIG. 6 presents a slider sub-assembly of the arm used to grip the lengthening piece of the clamp. This sub-assembly is formed by a first copper part 20 that comprises the locking function with the latch 13 moving vertically. During the gripping operation, the lengthening piece of the clamp and this copper part 20 are in contact at the conical part which provides for efficient passage of current during welding. The current then passes through the flexible link 21 which is obtained by an open circular element (three-quarters of a circle in the case of FIG. 6). This part constitutes a multiple-strip electrical shunt. Since the circle is open, it gets easily deformed to follow the motion of conversion of the linear motion of the rod of the thruster into a rotational motion of the mobile arm. The copper part 20 is connected to the ball joint of the mobile jaw and of the mobile arm.

The sub-assembly shown in FIG. 6 is electrically insulated from the rest of the arm. The guiding part for the rectilinear shift is provided by a plastic cylinder 22 that provides the electrical insulation. The sub-assembly also comprises two rings 23 placed at diametrically opposite positions on the surface of the cylinder 22. These rings get housed in oblong holes situated on each side of the flanks of the mobile arm and provide for the angular alignment of the slider sub-assembly.

FIG. 7 shows the way in which the clamp electrode and the arm get coupled in making an efficient electrical contact. The movement of the clamp electrode in the cylinder 22 is represented by an arrow.

FIG. 8 presents the position of the arm unit before it is inserted into the clamp 1, according to a preferred embodiment. The arm unit is provided with a blocking handle 30 that is presented in the figure as being tilted backwards. FIG. 8 also shows the head of the thruster 10. The fixed attachment mechanism comprises a lip 31 extending at the bottom part and towards the rear of the arm unit.

In a first stage, the unit is lowered as is shown by the arrow and the lip arrives at the entrance to a groove extending horizontally with the axis of the clamp 1.

FIG. 9 shows the male part 35 and the female part 36 forming the dovetail fastening to affix the two-arm unit to the clamp, these two elements being advantageously made of brass. The two cylindrical holes 32 correspond to the connection holes to connect the flexible tubes transporting the cooling liquid.

FIG. 10 presents an enlarged view of the elements used to lock the arm. The movement of the blocking handle (which has been removed in the image and gets fixed to the square-shaped shaft 33) prompts the rotation of two cams connected by an intermediate part. A pin is in contact with the off-centered profile made in the cam.

Before the locking, springs 34 push back the rings which then close the clack valves commanding the passage of cooling liquid (typically water). The passage of water is then closed, and the tight sealing is ensured by O-rings inside and outside the ring.

During the locking phase, the cams are put into rotation by the handle, and push the pins of the arm base frontwards. At the end of the travel, the two cams get shifted rearwards and compress the springs 34 which exert high stress. The gripping pressure is ensured by a skid in contact with the exterior of the cams.

FIG. 11 of the mechanism in an unlocked position.

During the unlocking, a form 35 guides the stud during the positioning of the base, and forces it to descend into a low position. At the end of the locking phase, the pin is completely descended. The connectors of the base then push the rings, thus compressing the springs 34 and opening the clack valves. The passage of cooling liquid is then open.

FIG. 12 shows the position of the arm unit when it is put into contact with the clamp. The operator now makes a rotational motion as is shown by the arrow in FIG. 12, to lower the front of the electrodes and thus position the arm unit horizontally.

FIG. 13 presents the position of the two-arm unit when it is in a horizontal position. The operator then carries out a rectilinear rearward shift to insert the male dovetail affixing element into the female element. FIG. 13 represents the position after this rectilinear shift.

FIG. 14 presents the position of the two-arm unit with the blocking handle 30 being lowered, thus ensuring efficient fixed attachment of the unit with the clamp. The lowered handle 30 exerts a constant force on the mechanism which is rigid enough not to get deformed under pressure from the thruster.

FIG. 15 presents the arm-and-clamp assembly with the rod of the thruster fixedly attached to the mobile arm. The fixed attachment takes place as described here above with reference to FIGS. 3, 4 and 5.

FIG. 15 shows the vertical rod ending in a right-angled element that exerts pressure on the latch to release the mobile arm. The pad 17 above the vertical rod can be seen in the figure. Since the thruster is pushed backwards, the electrodes are seen with the maximum spacing.

The detachment of the two-arm unit is done by a reverse motion. In a first stage, the operator presses the pad 17 to release the head of the rod of the thruster. The pressure on the bottom button 8 of the clamp causes the electrode to retract and the arm to be extracted. Then, the operator tilts the handle 30 backwards to release the pressure on the locking mechanism. The two-arm unit can then be withdrawn, firstly by exerting a horizontal linear motion rearwards and then in a rotational motion that causes the upward pivoting of the front of the unit. By this means, the unit can be carried by an upward motion.

Such a fixed attachment makes it possible to ensure the electrical connections as well as the hydraulic connections. Pipes indeed enable the conveying and return of a heat-conveying fluid into the metal masses of the electrodes.

The present invention describes an assembly constituted by an arm and a clamp, each of these elements constituting an essential element of the invention which is therefore covered by the present application.

Although the present invention has been described with reference to the particular embodiments illustrated, it is in no way restricted by these embodiments but is limited only by the appended claims. It will be noted that changes or modifications could be made by those skilled in the art.

The invention claimed is:

1. A resistance welder comprising:
   a clamp;
   a detachable arm supported by the clamp, said arm including a fixed part supporting a fixed electrode and a rotationally mobile part supporting a mobile electrode, the rotationally mobile part configured to rotate about an axis relative to the fixed part, the electrodes being configured to be crossed by an electrical current;
   a thruster supported by the clamp, said thruster configured to drive sliding movement of a rod, which drives rotation of the mobile part about the axis so that extremities of the fixed and mobile electrodes approach each other and grip elements to be welded; and
   a shift measurement sensor configured to measure a value indicating the sliding movement of the rod, said value being proportional to a distance between the extremities of the fixed and mobile electrodes, wherein the value is indicative of a thickness of the elements to be welded, and welding parameters for welding the elements may be deduced based on the value.

2. The resistance welder according to claim 1, further comprising a slider provided with a cylinder pushed in translation by a head of the thruster, said cylinder comprising first and second diametrically opposite rings that get housed in oblong holes situated on each side of flanks of the mobile arm to provide for angular alignment of the slider during shifting of the head of the thruster.

3. The resistance welder according to claim 1, further comprising a locking mechanism which locks the detachable arm to affix the detachable arm to the clamp, this locking mechanism comprising a lock comprising a latch that gets clipped into a groove.

4. The resistance welder according to claim 3, wherein locking of the detachable arm comprises moving the detachable arm downwards to engage a blocking element into the groove and then turning a handle to lock the arm.

5. The resistance welder according to claim 4, wherein the locking mechanism comprises first and second brass parts providing for mechanical locking, electrical continuity and passage of cooling water, the first and second brass parts being fixedly attached by two dovetails forming a "V".

6. The resistance welder according to claim 1, wherein detachable arm is a C-shaped arm constituted by the fixed part supporting the fixed electrode and the rotationally mobile part being mobile in translation supporting the mobile electrode, the thruster directly driving the motion of the mobile electrode.

7. The resistance welder according to claim 1, wherein the thruster comprises first and second solenoid valves and a chamber which is over-pressurized to bring the electrodes closer together and depressurized to move them further apart, wherein the first and second solenoid valves control a pressure of pneumatic fluid that actuates the thruster of the clamp, the first and second solenoid valves which, when open, generate a Venturi effect on pipings and a pressure lower than atmospheric pressure, this pressure being transmitted to the clamp unit by a flexible tube.

* * * * *